T. R. BAILEY.
MORTISING MACHINE.
No. 15,467.
PATENTED AUG. 5, 1856.
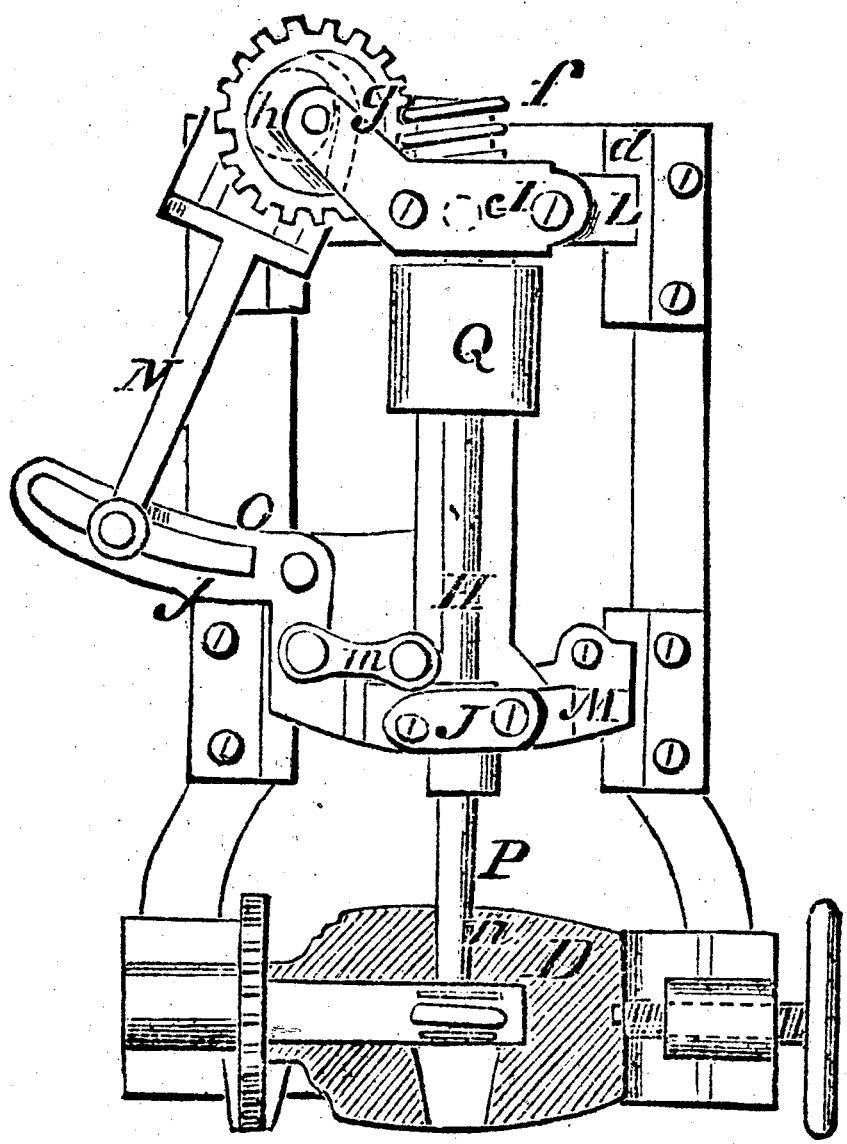
*TAKEN FROM PATENT OFFICE REPORT*
*1856 — VOL. III.*
*ONLY DRAWING ACCESSIBLE (1912)*

UNITED STATES PATENT OFFICE.

T. R. BAILEY, OF LOCKPORT, NEW YORK.

MORTISING-MACHINE.

Specification of Letters Patent No. 15,467, dated August 5, 1856.

*To all whom it may concern:*

Be it known that I, THOMAS R. BAILEY, of Lockport, in the county of Niagara and State of New York, have invented a new and Improved Machine for Mortising Hubs for Wheels; and I do hereby declare that the following is a full, clear, and exact description of the same, reference being had to the annexed drawing, making a part of this specification, said drawing being a plan or top view of my improvement.

My invention consists in the employment or use of a rotating and vibrating mandrel to which the cutter is attached, said mandrel being arranged and operating in a peculiar manner, as will be hereinafter fully shown and described.

To enable those skilled in the art to fully understand and construct my invention, I will proceed to describe it.

A, represents a frame or bed on one end of which, two heads B, C, are placed between which heads the hub D, to be mortised is secured between centers, in the same way as articles are secured in an ordinary turning lathe.

One of the arbors $a$, the one in the head B, has a screw thread upon it and has a hand-wheel E, on its outer end. The other arbor $b$, in the head C, has a notched disk F, upon it, in which notches a pawl G, catches and retains the hub in proper position, or prevents it from turning.

H, represents a mandrel which works in bearings I, J, one at each end of a plate K. The bearing I works on a pivot or center pin $c$, on a crossplate L, which is allowed to slide freely on ways $d, d$, on the frame or bed A. The bearing J, is allowed to slide laterally on a segment plate M, which is fitted on ways $e, e$, which are in line with the ways $d, d$.

The mandrel H, consequently can be turned back and forth on the ways $d, d, e, e$, and longitudinally with the bed plate or frame A. The outer end of the mandrel H, has a screw $f$, cut upon it, and this screw gears into a worm-wheel $g$, which has an eccentric $h$, attached to its under side. A strap $i$, passes around this eccentric and is connected to a pitman N, the outer end of said pitman being secured within a slotted arm $j$ of a bent or right-angled lever O, which works on a pivot $k$, on the plate M. The shorter arm $l$, of this lever is connected by a link $m$, with the inner end of the plate K.

P, represents the cutter which is secured within the inner end of the mandrel H. This cutter is formed of a steel rod having spiral cutting edges $n$, formed on its sides as shown clearly in the drawing.

Q, is the driving pulley on the mandrel H.

The operation will be readily seen. As the mandrel H, is rotated a rotary motion is given the cutter and also a lateral vibrating motion, the latter movement being given by the screw $f$, worm wheel $g$, pitman N and bent lever O. The mandrel H, is shoved forward toward the hub D, by hand or by any proper feeding device. The cutter P enters the hub and cuts at right angles to its axis and as it vibrates laterally the mortise will be cut the proper length and the ends of the mortises will be cut of taper form, as shown in the drawing, because the bearing I, of the mandrel works on the pivot $c$. The length of the mortise is regulated by adjusting the connection of the pitman N, with the arm $j$, of the lever O.

The hub D, is turned as each mortise is cut, by freeing the pawl G from the notched disk F, and moving or turning the hub D, the distance of one notch.

By the above improvement the mortises will be made in dove-tail form and be cut with rapidity. The machine is simple, not liable to get out of repair and may be cheaply constructed.

I do not claim a rotating and vibrating mandrel, irrespective of the construction and arrangement herein shown, but What I do claim as new and desire to secure by Letters Patent, is—

The mandrel H, fitted in bearings I, J, attached to sliding plates L, M, one of the bearings, I, being pivoted to the plate L, and the other bearing J, allowed to slide on the other plate M, the mandrel H, being vibrated laterally by the screw $f$, worm wheel $g$, eccentric $h$, pitman N and bent lever O, the whole being arranged as shown for the purpose set forth.

T. R. BAILEY.

Witnesses:
    D. A. SHEERMANN,
    WALTER SIMMONS.